United States Patent [19]

Phillips

[11] Patent Number: 5,303,532
[45] Date of Patent: Apr. 19, 1994

[54] MOWER SUPPORT APPARATUS AND SYSTEM

[76] Inventor: Barry L. Phillips, 3620 Dixie Ct. SE., Cleveland, Tenn. 37323

[21] Appl. No.: 920,777

[22] Filed: Jul. 28, 1992

[51] Int. Cl.[5] ............................................. A01D 34/64
[52] U.S. Cl. .................................... 56/12.7; 56/13.8; 56/14.9; 56/DIG. 9
[58] Field of Search ................... 56/12.1, 12.7, 14.9, 56/15.6, DIG. 9, 13.6, 13.7, 13.8, 16.7

[56] References Cited

U.S. PATENT DOCUMENTS

| | | | |
|---|---|---|---|
| 3,261,150 | 7/1966 | Fitzgerald, Sr. | 56/13.7 |
| 3,444,674 | 5/1969 | Huff et al. | 56/12.7 |
| 3,715,872 | 2/1973 | Thompson, Jr. | 56/16.7 |
| 4,077,190 | 3/1978 | Crites | 56/12.7 |
| 4,170,099 | 10/1979 | Owens | 56/16.9 |
| 4,182,100 | 1/1980 | Letter | 56/16.7 |
| 4,642,976 | 2/1987 | Owens | 56/16.9 |
| 4,663,920 | 5/1987 | Skovhoj | 56/12.7 |
| 4,688,376 | 8/1987 | Wolfe, Sr. | 56/16.7 |
| 5,065,566 | 11/1991 | Gates | 56/12.7 |

FOREIGN PATENT DOCUMENTS

207844 3/1957 Australia .

*Primary Examiner*—Mark Rosenbaum
*Assistant Examiner*—John M. Husar
*Attorney, Agent, or Firm*—Luedeka, Hodges, Neely & Graham

[57] ABSTRACT

A mowing system capable of being pulled behind a tractor or other prime mover utilizes a support apparatus for supporting a grass cutter adapted to cut grass as the cutter is rotated and moved forwardly into cutting relationship with grass. The support apparatus includes a wheeled frame for supporting the cutter for rotation and including a guard disposed on the forward side of the cutter. A pair of arm members are pivotally connected between the rear of the tractor and the wheeled frame to accommodate pivotal movement of the wheeled frame between an operative position at which the cutter is positioned for cutting grass disposed generally to one side of the tractor and a deflected position. A biasing mechanism, such as a spring, is connected between the tractor and the frame for biasing the frame from the deflected position toward the operative position so that when the frame is positioned in its operative position and moved by the tractor so that the guard is moved against an upstanding object, the frame can be pivoted by the object toward the deflected position in opposition to the force of the biasing mechanism to accommodate movement of the guard past the object and so that upon movement of the guard is moved past the object, the biasing mechanism returns the frame to its operative position.

14 Claims, 5 Drawing Sheets

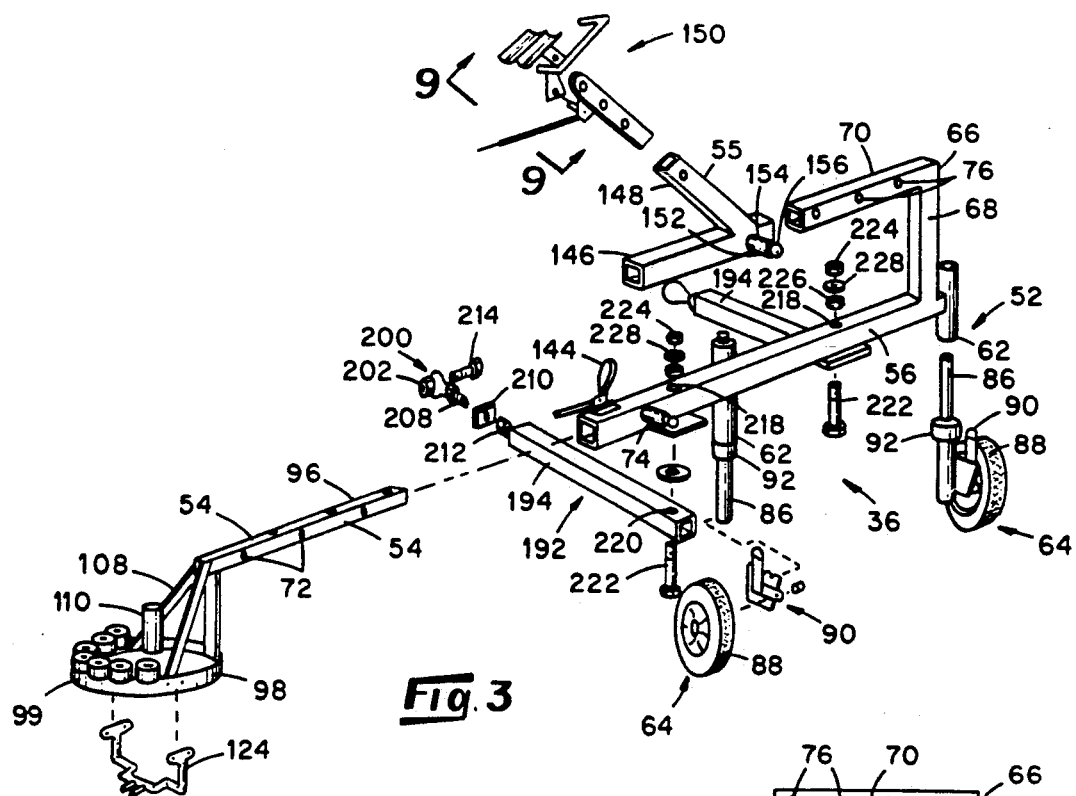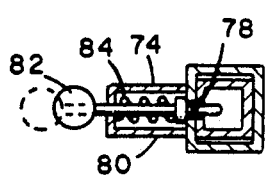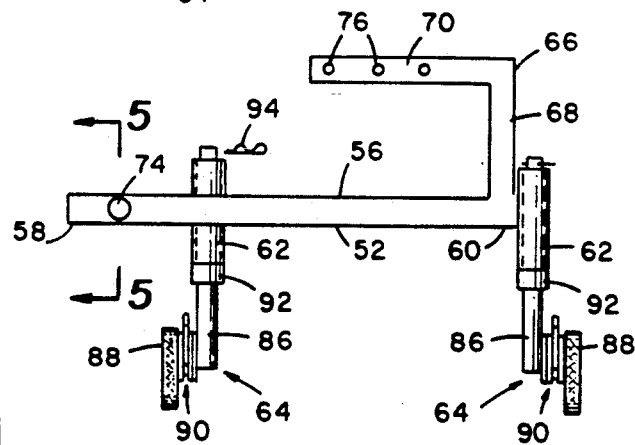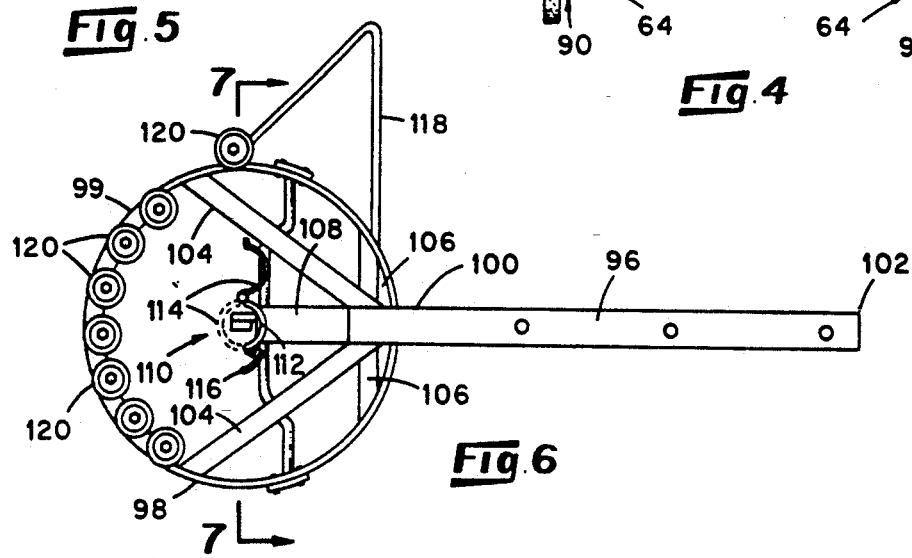

MOWER SUPPORT APPARATUS AND SYSTEM

BACKGROUND OF THE INVENTION

This invention relates generally to mowing equipment and relates, more particularly, to mowing apparatus for use with a prime mover, such as a tractor.

There exists several mowing systems which employ a rotating cutter and which are capable of being powered along the ground by means of a prime mover. One such system, shown and described in U.S. Pat. No. 5,065,566, is a string trimmer system used in conjunction with a riding lawn mower.

It is an object of the present invention to provide a new and improved apparatus for supporting a rotating grass cutter for use with a prime mover, such as a tractor.

Another object of the present invention is to provide such an apparatus which protects the rotating grass cutter from damage by an upstanding object.

Still another object of the present invention is to provide such an apparatus for supporting a portable string trimmer for use.

A further object of the present invention is to provide such an apparatus which is uncomplicated in construction and effective in operation.

A still further object of the present invention is to provide a new and improved system which utilizes such support apparatus.

Yet another object of the present invention is to provide such a system which is particularly well-suited for trimming grass over a ditch or around or along upstanding objects such as fence posts, chain-link fences and cemetery headstones.

SUMMARY OF THE INVENTION

This invention resides in apparatus and an associated system utilizing a cutter adapted to cut grass when rotated and moved forwardly into cutting relationship with the grass and wherein the apparatus is intended to be moved by a prime mover during use.

The apparatus of the invention includes a frame for supporting the cutter for rotation and including guard means disposed on the forward side of the cutter. The frame is connectable to a prime mover by pivotal connecting means enabling the frame to be moved by the prime mover and permitting the frame to be pivoted relative to the prime mover between an operative position at which the cutter is positioned for cutting grass and a deflected position so that when the frame is positioned in its operative position and the guard means is moved into contact with an upstanding object, the frame can be pivoted by the upstanding object toward its deflected position to accommodate the movement of the guard means past the object. The apparatus also includes means associated with the frame for biasing the frame from the deflected position toward the operative position so that when the frame is moved out of its operative position by an upstanding object and is subsequently advanced so that the guard means is moved past the object, the frame is returned to its operative position by the biasing means.

The system of the invention includes the rotatable cutter and the apparatus of the invention.

BRIEF DESCRIPTION OF THE DRAWINGS

FIG. 3 is a perspective view of several components of the apparatus of the FIG. 1 system, shown exploded.

FIG. 4 is a rear elevation view of one component of the FIG. 3 apparatus.

FIG. 5 is a cross-sectional view taken about along line 5—5 of FIG. 4.

FIG. 6 is a plan view of another component of the FIG. 3 apparatus.

DETAILED DESCRIPTION OF THE ILLUSTRATED EMBODIMENTS

Figure 1:
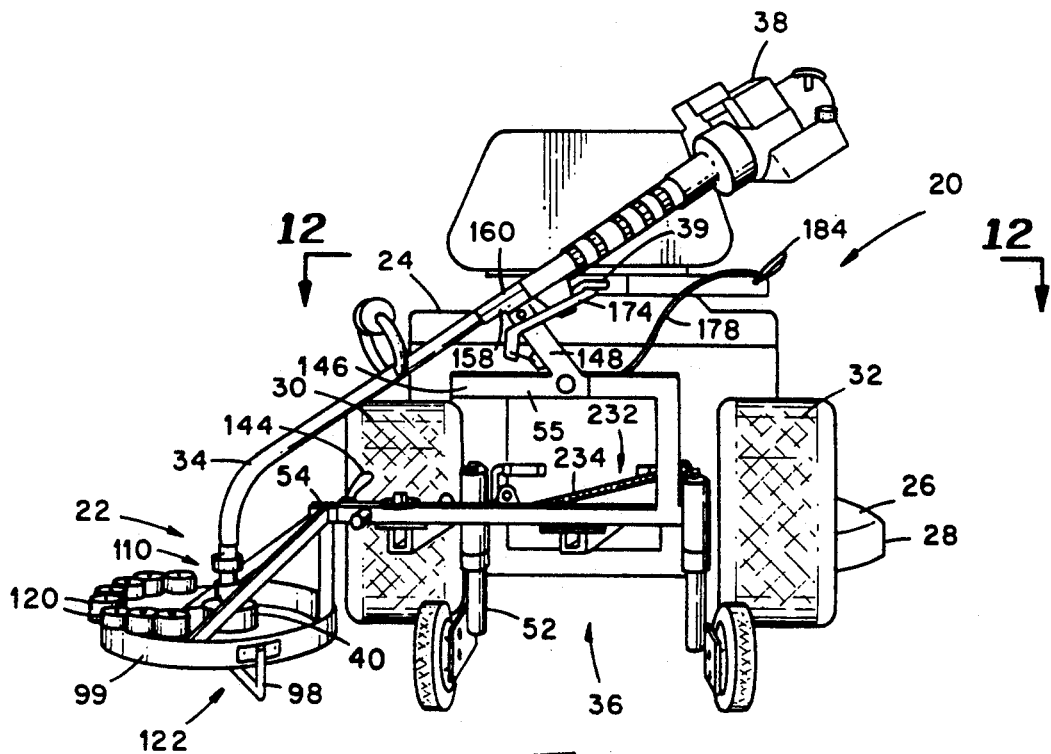
FIG. 1 is a rear perspective view of an embodiment of a trimmer system shown utilized with a riding lawn mower.

Turning now to the drawings in greater detail, there is illustrated in FIG. 1 a riding lawn mower 20 and an embodiment of a trimmer system 22 connected to so as to trail the mower 20 as the mower 20 is driven across the ground. The mower 20 includes a prime mover in the form of a tractor 24 and a mower system 26 attached so as to be suspended beneath the tractor 24. The mower system 26 includes a rotary mower blade (not shown) and a deck 28 within which the blade is housed. In the depicted example, the cutting swath of the mower blade corresponds generally with the distance as measured between the outside surface of a wheel 30 positioned on one side of the tractor 24 and the outside surface of a wheel 32 positioned on the other side of the tractor 24.

The trimmer system 22 incorporates features of the present invention and includes a string trimmer 34 and support apparatus 36 for supporting the string trimmer 34 for use. The apparatus 36 is connectable to the rear of the tractor 24 and supports the string trimmer 34 for trimming grass disposed outboard of the cutting swath of the mower system 26, or behind and to one side of the tractor 24, as the tractor 24 is driven across the ground.

Although the depicted system 22 is described herein as including a string trimmer 34 for mowing or trimming grass and the tractor 24 is of a relatively small size normally associated with a riding lawn mower, it will be understood that the principles of the present invention may be incorporated within other mower systems employing rotating cutters, such as rotatable blades or chains, and which may be pulled by other prime movers, such as relatively large tractors normally used in agriculture applications. Moreover, although the string trimmer 34 of the depicted system 22 is of a class of portable trimmers capable of being attached to or detached from the apparatus 36, a system in accordance with the broader aspects of the invention may include a motor and trimmer head which are permanently mounted upon a support apparatus. Accordingly, the principles of the present invention may be variously applied.

Figure 2:
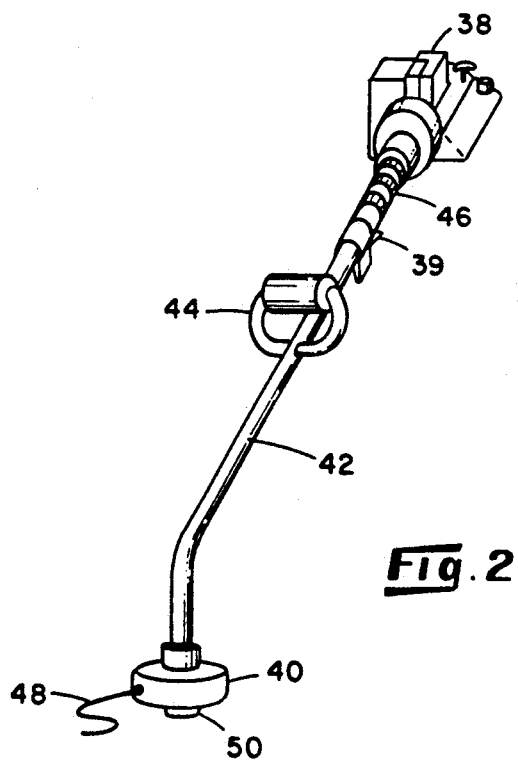
FIG. 2 is a perspective view of the trimmer used in the FIG. 1 system.

The string trimmer 34, best shown in FIG. 2, is one of several commercially-available brands suitable for use with the system 20. The depicted trimmer 34 is portable and includes a gasoline-powered motor 38 having a finger-actuated throttle 39 and a trimmer head 40 joined to the motor 38 by a shaft 42. A handle 44 and grip 46 are associated with the shaft 42 which enable the trimmer 34 to be easily carried. A roll of trimmer string 48 is rotatably mounted within the head 40 and appropriately connected to the motor 38 by way of a cable extending through the shaft 42 so that operation of the motor 38 rotates the roll of string 48 about an axis. A string-extending mechanism carried by the head 40 includes a downwardly-depending shoe 50 adapted to extend the length of string available for trimming as the shoe 50 is moved upwardly relative to the remainder of the head 40. The structure and operation of the trimmer 34 and its various components are well-known in the art so that a more detailed description is not believed to be necessary. The depicted trimmer 34 is commercially available under the trade designation "McCulloch", but an alternative trimmer suitable for use is commercially available under the trade designation "Homelite".

With reference to FIGS. 1 and 3, the support apparatus 36 includes a main section in the form of a wheeled frame 2 and first and second boom section 54 and 55, respectively, attached to the frame 52. As best shown in FIGS. 3 and 4, the wheeled frame 52 includes a horizontally-disposed tube member 56 having two opposite ends 58, 60 and a pair of upright sleeve members 62 fixedly joined to the tube member 56. Each sleeve member 52 is disposed substantially vertically and accepts the shaft of a caster-type wheel assembly 64, described herein. The frame 52 also includes an L-shaped section 66 having a first tube member 68 fixed to the horizontally-disposed tube member 56 adjacent the end 60 thereof and a second tube member 70 oriented substantially parallel to the tube member 56 for supporting the second boom section 55. The second tube member 70 includes a series of spaced through-openings 76 along its length for a reason apparent herein. The horizontally-disposed tube member 56 is open at its end 58 for accepting a portion of the first boom section 54 and includes a pair of spaced through-openings 72 as shown in FIG. 3. Each of the tube members 56, 68 or 78 is substantially square in cross section and constructed, for example, of steel.

An adjustment knob assembly 74 is jointed to one side of the tube member 56 adjacent the end 58. More specifically and as best shown in FIG. 5, the knob assembly 74 includes an outer housing 80, a knobbed pin 82 positioned partly within the housing 80 and a compression spring 84 for acting between the housing 80 and the pin 82. The tube member 56 is provided with an aperture 78 for accepting the end of the pin 82, and the spring biases the pin 82 from a position as shown in phantom in FIG. 5 at which the pin 82 is withdrawn from the aperture 78 and a position as shown in solid lines in FIG. 5 at which the pin 82 is received by the aperture 72. As will be apparent herein, the pin 82 accommodates an adjustment in position of the first boom section 54 along the length of the tube member 56.

As best shown in FIG. 3, each caster-type wheel assembly 64 includes a shaft 86 and a wheel 88. An adjustment assembly 90, whose construction and operation is well-known, is interposed between the wheel 88 and the shaft 86 to accommodate an adjustment in position of the wheel 88 relative to the shaft 86. Therefore, by positioning the shaft 86 into its corresponding sleeve member 62 as shown in FIG. 4, the adjustment assembly 90 enables the height of the tube member 56 relative to the ground to be adjusted.

With reference still to FIG. 4, each shaft 86 includes a collar 92 through which the weight of the tube member 56 is transferred to the shaft 86, and each wheel assembly 64 is secured to the tube member 56 by means of a key 94 inserted through the shaft 86 adjacent the upper end thereof so that the sleeve member 62 is captured between the key and the collar 92 of the shaft 86. The portion of the shaft 86 positioned within the sleeve member 62 is permitted to rotate therein to accommodate a change of direction of the corresponding wheel 88. Accordingly, the inner diameter of the sleeve member 62 is slightly larger than the diameter of the portion of the shaft 86 positioned within the sleeve member 62.

With reference to FIGS. 3 and 6, the first boom section 54 includes a tube member 96 supportedly received by the end 58 of the tube member 56 of the wheeled frame 52 and a hoop 98 fixedly attached to the tube member 96. The tube member 96 has two opposite ends 100 and 102, and the hoop 98 is attached to the tube member 96 by a plurality of braces 104, 106 extending therebetween. In particular, each brace 104 or 106 is included at one end to the tube member 96 adjacent its end 100 and is welded at its other end to the hoop 98 so that the plane of the hoop 98 is substantially parallel to the tube member 96. Therefore, when the tube member 96 is received by the tube member 56, as shown in FIG. 1, the hoop 98 is substantially parallel to the ground. The tube member 96 is substantially square in cross section to prevent rotation of the tube member 96 within the tube member 56.

The first boom section 54 also includes an arm member 108 attached at one end to the tube member 96 adjacent its end 100 and a clamp arrangement 110 fixedly attached to the end of the arm member 108 opposite the tube member 96 for holding the head end of the trimmer 34. The clamp arrangement 110 includes a first clamp section 112 fixed to the arm member 108 and a second clamp section 114 pivotally attached to the first clamp section 112 for pivotal movement between an opened condition (shown in solid lines in FIG. 6) at which the shaft 42 of the trimmer 34 can be positioned sidewise into the first clamp section 112 and a closed condition (shown in phantom in FIG. 6) at which the shaft 42 can be releasably held between the clamp sections 112, 114. The clamp arrangement 110 can be maintained in its closed condition with an over-center linkage arrangement 116 attached to the first clamp section 112 and cooperable with the second clamp section 114.

The first boom section 54 also includes a V-shaped member 118 which is attached to the hoop 98 so that its apex extends forwardly (in relation to the intended direction of movement of the apparatus 36) of the hoop 96, as shown in FIG. 6. The boom section 54 also includes a plurality of spaced rollers 120 rotatably attached adjacent the hoop 98 so that the rollers 120 extend for an appreciable distance around the periphery of the hoop 98. Each roller 98 of the depicted apparatus 36 is in the form of a roller skate wheel mounted upon an axle attached to either the inside surface of the V-shaped member 118 or the inside surface of the hoop 98 for rotation about an axis oriented substantially perpendicular to the plane of the hoop 98. Moreover, the rollers 98 are disposed in such a relation to the hoop 98 so that a portion of the circumference of each roller 98 extends beyond the periphery of the hoop 98. As will be apparent herein, the V-shaped member 118, hoop 98 and rollers 120 provide a guard 99 for preventing the trimmer head 40 from being struck or contacted by an upstanding object past which the tractor 24 may be driven.

Figure 7:
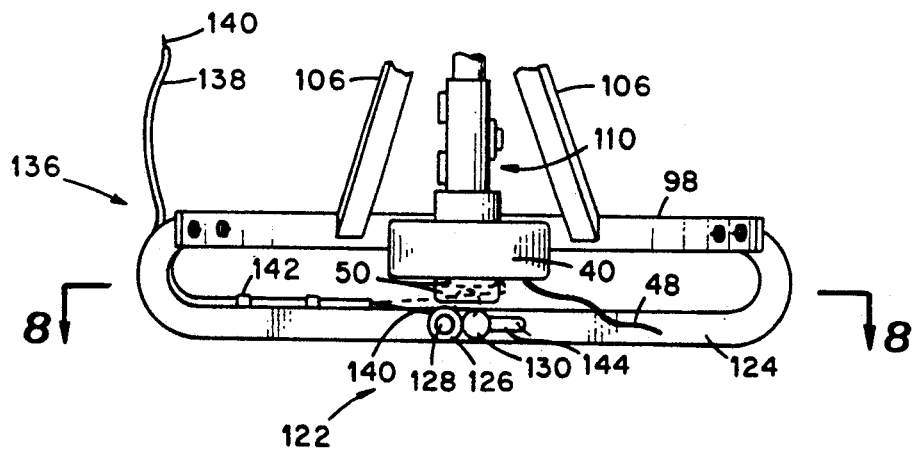
FIG. 7 is a cross-sectional view taken about along line 7—7 of FIG. 6 shown with the head of the FIG. 2 trimmer clamped within the FIG. 6 component.
Figure 8:
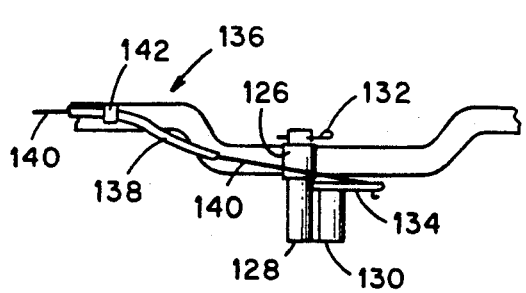
FIG. 8 is a plan view of a fragment of the apparatus as viewed along line 8—8 of FIG. 7.

Also associated with the first boom section 54 are means, generally indicated 122 in FIG. 1, for moving, or depressing, the shoe 50 (FIG. 2) of the trimmer 34 upwardly to extend the length of the trimmer string 48 by an incremental amount, when desired. As best shown in FIG. 7, the moving means 122 includes an elongated guard rod 124 which is connected at each end to opposite sides of the hoop 98. The guard rod 124 includes C-shaped end portions sized to accommodate movement of the trimmer string 48 through the Cs of the end portions. As shown in FIG. 8, a bushing 126 is fixed to the rod 124 substantially centrally of the rod ends, and a pair of cylindrical plugs 128, 130 are fixed to one another in a side-by-side relationship as shown in FIG. 8. One plug 128 is rotatably secured within the bushing 126 with a key 132, and a lever 134 is fixed at one end to the plug 130.

A cable assembly 136 having a housing 138 and a cable 140 are suitably attached to the lever 134 for rotating the plug 130 about the bushing 126 between two angular positions. More specifically, the cable housing 136 is fixed to the rod 124 with suitable clamps 142 and one end of the cable 140 is connected to the lever 134 adjacent the end thereof opposite the plug 130. By moving the cable 140 longitudinally along the housing 138, the plug 130 is moved between a lowered position, as illustrated in solid line in FIG. 7, and a raised position, as illustrated in phantom in FIG. 7. As the plug 130 is lifted from its FIG. 7 solid-line position to its FIG. 7 phantom-line position, the shoe 50 is depressed in relation to the head 40 to thereby extend the length of string 48. By returning the plug 130 to its FIG. 7 lowered (solid-line) position, the shoe 50 is permitted to return to its FIG. 7 lowered position. As shown in FIG. 3, the other end of the cable 140 is connected to a lever assembly 144 enabling an operator to extend the string length by appropriate manipulation of the lever assembly 144. In the depicted apparatus 36, the lever assembly 144 is mounted upon the tube member 56 of the wheeled frame 52 for accessibility to an operator.

With reference again to FIGS. 1 and 3, the second boom section 55 includes two angularly-related square tube members 146, 148 joined together in the manner shown and a clamp assembly 150 joined to the tube members 146, 148. One tube member 146 is positioned endwise upon the tube member 70 of the frame 52 for sliding movement therealong, and a knob assembly 152, like that of the knob assembly 74 of FIG. 5, is joined to the tube member 146 as shown in FIG. 3. The knob assembly 152 includes a housing 154 and a spring-biased knobbed pin 156 positioned within the housing 154 for cooperating with the through-openings 76 provided in the tube member 70 to releasably secure the tube member 146 in a desired position along the length of the tube member 70. More specifically, by pulling upon the knobbed pin 156 so that it is withdrawn from one of the through-openings 76, the tube member 146 may be slidably moved to an alternative position upon the tube member 70 where the pin 156 may be accepted by an alternative through-opening 76.

Figure 9:
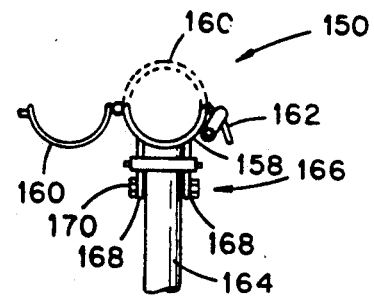
FIG. 9 is a fragmentary view of still another component of the FIG. 3 apparatus as viewed along line 9—9 of FIG. 3.

As best shown in FIG. 9, the clamp assembly 150 includes a pair of clamp sections 158, 160 pivotally joined to one another for movement between an open condition as illustrated in solid lines in FIG. 9 for accepting the shaft 42 of the trimmer 34 positioned sidewise therein and a closed condition as illustrated in phantom in FIG. 9 at which the trimmer shaft 42 can be releasably held between the two clamp sections 158, 160. An over-center latch mechanism 162 is attached to one side of the clamp section 158 for releasably securing the clamp sections 158, 160 in the closed condition.

The clamp assembly 150 also includes a tube section 164 positionable within the open end of the tube member 168 and means, generally indicated 166, for pivotally attaching the clamp sections 158, 160 to the tube section 164. In the depicted assembly 150, the attaching means 166 includes a pair of plates 168 fixedly attached to the underside of the clamp section 160, as shown in FIG. 9, and a bolt 170 secured through aligned openings in the plates 168 and one end of the tube section 164 to accommodate pivotal movement of the clamp sections 158, 160 relative to the tube section 184 between, for example, the position of the clamp sections 158, 160 illustrated in solid lines in FIG. 11 and the position of the clamp members 158, 160 illustrated in phantom in FIG. 11.

Figure 10:
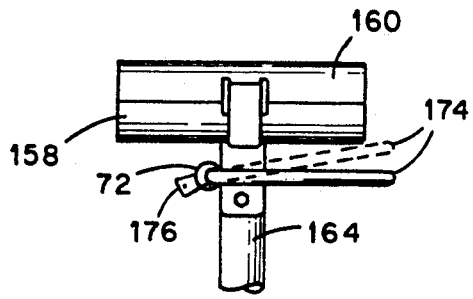
FIG. 10 is an elevational view of the component of FIG. 9 as seen generally from the right in FIG. 9.
Figure 11:
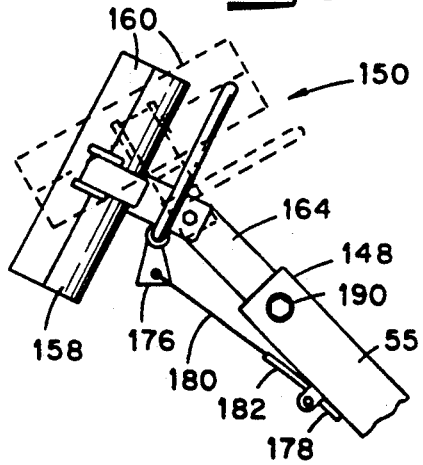
FIG. 11 is a fragmentary view similar to that of FIG. 10 of the FIG. 9 component when positioned within the remainder of the FIG. 3 apparatus.
Figure 12:
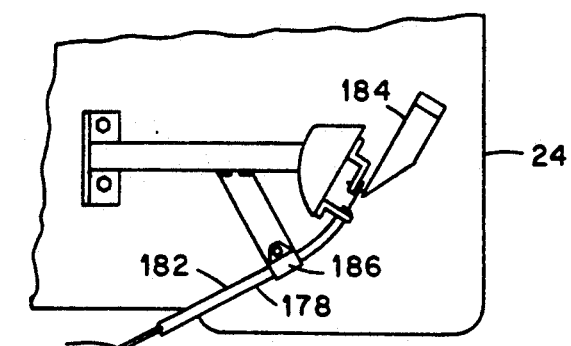
FIG. 12 is a fragmentary plan view of yet another component of the apparatus of the FIG. 1 system as viewed along line 12—12 of FIG. 1.

There is also a collar 72 fixedly joined across the plates 168 of the clamp assembly 150 and a lever member 174 having a portion secured within the collar 72 for pivotal movement between a position illustrated in solid lines in FIG. 10 and a position illustrated in phantom in FIG. 10. A tab 176 is fixed to the end of the lever member 174 adjacent the collar 72, and a cable assembly 178 having a cable 180 and a housing 182 are associated with the lever member 174 for moving the lever member 174 between the FIG. 10 solid and phantom-line positions. More specifically, one end of the cable 180 is attached to the tab 176 as shown in FIG. 11, and the other end of the cable 180 is attached to a lever 184 as shown in FIG. 12 so that manipulation of the lever 184 moves the lever member 174 between its FIG. 10 solid and phantom-line positions. The cable housing 182 is secured against movement with the cable 180 by means of a clamp 186 attached to the tube member 148 and a bracket 188 mounted upon the tractor 24.

When the trimmer 34 is operatively positioned between the clamp sections 158, 160 as shown in FIG. 1 and pivoted by means of the cable assembly 178, the lever member 174 cooperates with the trigger throttle 39 of the trimmer 34 to vary the speed of the motor 38, and thus the rotational speed of the trimmer string 48. More specifically, as the lever member 174 is moved from its FIG. 10 solid-line position toward its FIG. 10 phantom-line position, the lever member 174 urges the trigger throttle 39 upwardly to increase the speed of the motor 38, and as the lever member 174 is returned toward its FIG. 10 solid-line position, the trigger throttle 39 is permitted to move downwardly and thus decrease the motor speed. The frictional engagement between the cable 180 and housing 182 is large enough so that after the lever 184 is moved to a selected position by means of the cable assembly 178 at which a desired motor speed is attained, the lever 184 is maintained in its selected position until subsequently moved by the cable assembly 178 to an alternative position. The lever 184 is pivotally attached to the bracket 188 as shown in FIG. 11 which is, in turn, fixedly attached to a fender of the tractor 24 as shown in FIG. 1 so as to be readily accessible to an operator seated upon the tractor 24.

With reference again to FIG. 11, the tube section 164 of the clamp assembly 150 is slidably accepted by an end of the tube member 148 of the second boom section 55 to accommodate an adjustment in position of the clamp assembly 150 relative to the tube member 148. More specifically, by moving the tube section 164 in a telescoping fashion along the length of the tube member 148, the position of the clamp sections 158, 160 relative to the tube member 148 can be altered. For purposes of releasably securing the tube section 164 in a desired position along the length of the tube member 148, a bolt 190 is threadably received by a threaded opening provided within one side of the tube member 148 and which is tightenable against a side of the tube section 164 for maintaining the tube section 164 in a preselected position along the length of the tube member 148. Alternatively, aligned holes may be provided in the tube member 148 and tube section 164 to accept the shank of a bolt positioned through the aligned holes.

Figure 13:
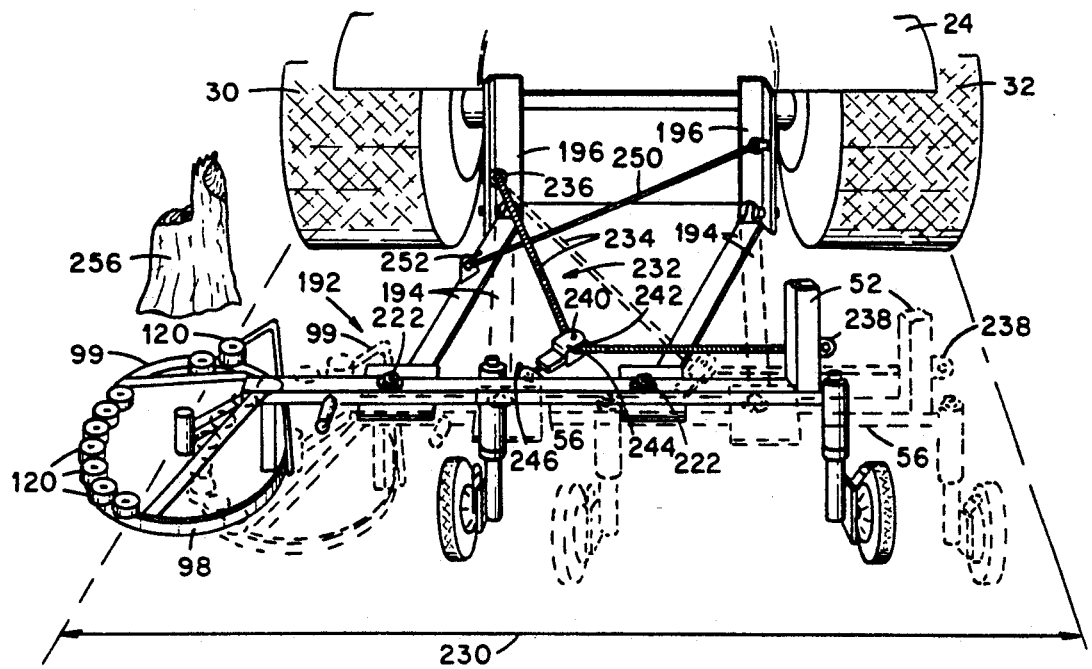
FIG. 13 is a fragmentary perspective view of the apparatus of the FIG. 1 system shown connected to the riding lawn mower of FIG. 1.
Figure 14:
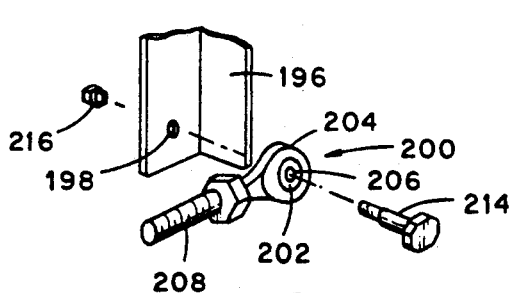
FIG. 14 is a fragmentary perspective view of the arrangement with which the FIG. 1 apparatus is connected to the FIG. 1 lawn mower, shown exploded.

With reference to FIGS. 3 and 13, the apparatus 36 also includes means, generally indicated 192, for pivotally connecting the wheeled frame 52 to the rear of the tractor 24 to accommodate a pivotal movement of the frame 52 relative to the tractor 24 from an operative position as shown in solid lines in FIG. 13 to a deflected position as shown in phantom in FIG. 13. In the depicted apparatus 36, the pivoting means 192 includes a pair of arm members 194 each having opposite ends which are pivotally joined to the rear of the tractor 24 and to the wheeled frame 52, respectively. In this connection, there is associated with the rear of the tractor 24 a pair of spaced hitch bars 196, each disposed substantially vertically as viewed in FIGS. 13 and 14 and provided with an opening 198 adjacent its lower end. For attachment of one end of each arm member 194 to a corresponding hitch bar 196, there is attached to each arm member 194 a connecting assembly 200 provided with a ball 202 and ring 204. As best shown in FIG. 14, the ball 202 has an opening 206 extending therethrough and is captured within the ring 204 in a manner known in the art which permits the ball 202 to be shifted and rotated within the ring 204 so that the center axis of the opening can be varied with respect to the plane of the ring 204.

The connecting assembly 200 also includes a threaded shank 208 sized for acceptance by an opening provided in a plate 210 (FIG. 3) and for threadably accepting a nut 212 welded to the plate 210 about the opening thereof. To secure each connecting assembly 200 to its corresponding arm member 194, the plate 210 is welded to an end of the arm member 194, and the shank 208 is tightened within the nut 212. Securement of each connecting assembly 200 to its corresponding hitch bar 196 is effected by means of a shoulder bolt 214 inserted, in sequence, through the ball opening 206 and the hitch bar opening 198 and a nut 216 threaded upon the bolt 214. It follows that each arm member 194 may be pivoted relative to the corresponding hitch bar 196 as the ring 204 is pivoted about the corresponding ball 202.

For pivotal attachment of each arm member 194 to the frame 52 and with reference to FIG. 3, the horizontally-disposed member 56 includes a pair of vertical openings 218, and each arm member 194 includes a vertical through-opening 220 adjacent its end opposite the connecting assembly 200. The through-opening 220 of each arm member 194 is aligned with the tube member opening 218, and a shoulder bolt 222 is inserted upwardly through the aligned openings 220 and 218 and secured therethrough with a nut 224 threaded upon the shank-end of the bolt 222. If desired, spacers 226 and washers 228 may be positioned between adjacent surfaces of the head of the bolt 226, the arm member 194, the tube member 56 and the nut 228 to reduce the resistance to pivotal movement of the arm member 194 relative to the tube member 56.

It follows from the foregoing that the frame 52 can be pivotally moved between the operative, solid-line position of FIG. 13 to the deflected, phantom-line position of FIG. 13 as the arm members 194 pivot relative to the hitch bars 196 of the tractor 24 and the tube member 56 pivots relative to the arm member 194. In the interests of this invention, the frame 52 is positioned in its operative position when positioned so that the trimmer 34 supported thereby is in position for cutting or trimming grass. In the depicted embodiment, when the frame 52 is positioned in the FIG. 13 solid-line position, the trimmer head 40 is supported in such a relation to the tractor 24 that the trimmer string 48 rotated at the head 40 trims grass disposed generally to one side of the tractor 30 or, in other words, grass disposed outboard of the span, indicated 230 in FIG. 13, bounded by the outside boundaries of the tractor wheels 30, 32. In the depicted example, the span 230 corresponds to the cutting swath of the mower 26 supported beneath the tractor 34 so that grass trimmed by the trimmer string 48 is disposed to one side of the cutting swath of the mower 26. By comparison, when the frame 52 is positioned in the deflected, phantom-line position, the trimmer head 40 is supported entirely behind the tractor 24 and the guard 99 is disposed inboard of the tractor wheel span 230.

With reference again to FIGS. 1 and 13, the apparatus 36 also includes means, generally indicated 232, for biasing the wheeled frame 52 from its FIG. 13 phantom-line position toward its FIG. 13 solid-line position. In the depicted embodiment, such biasing means 232 are provided by an elongated tension spring 234 joined between the wheeled frame 52 and the rear of the tractor 24. More specifically, one end of the spring 234 is connected to an eyelet fastener 236 suitably fixed to one of the hitch bars 196 as shown in FIG. 13, and the other end of the spring 134 is suitably fixed to a flange member 238 welded to the tube member 68. A pulley assembly 240 having a pulley 242 is disposed between the ends of the spring in the manner shown in FIG. 13 so that the spring 234 is constantly maintained in tension. As best shown in FIG. 13, the pulley assembly 240 includes a bifurcated member 244 between which the pulley 242 is rotatably attached and which member 244 is suitably attached, as with a fastener, to a flange member 246 welded atop the tube member 56.

If desired, the tension of the spring 242 can be adjusted by, for example, altering the position of the pulley 242 relative to the flange member 246. Such an adjustment can be effected by adjusting the position of the fastener used to secure the bifurcated member 244 to the flange member 246 to thereby alter the position of the pulley 242 relative to the flange member 246, and such an adjustment may be desired if, for example, the apparatus 36 is used along a slope and greater spring tension is necessary to maintain the frame 52 in its operative position in opposition to the influence of gravity. Alternatively, the spring 234 can be replaced with a fluid or gas-filled cylinder adapted to urge the frame 52 from its deflected position toward its operative position.

While the frame 56 is biased from the FIG. 13 phantom-line position by the spring 234, the movement of the frame 56 is limited to the FIG. 13 solid-line position by means of a cable 250 extending between the rear of the tractor 24 and one of the arm members 194. More specifically and as best shown in FIG. 13, one end of the cable 250 is suitably attached, as with a clevis, to the rightwardmost (as viewed in FIG. 13) hitch bar 196 and the other end of the cable 250 is suitably attached, as with a fastener, to a flange member 252 welded atop the leftwardmost (as viewed in FIG. 13) arm member 194.

Once the apparatus 36 has been connected to the rear of the tractor 24 as described above, the trimmer 34 is secured within the clamp arrangement 110 (FIG. 6) and the clamp assembly 150 (FIG. 9) to secure the trimmer 34 within the apparatus 36. To this end, the clamp assembly 150 is adjusted (i.e., the pivotal relation of the clamp sections 158, 160 relative to the tube section 164 and the position of the tube section 164 relative to the tube member 148) as necessary so that the head 40 of the trimmer 34 is substantially parallel to the ground and the clamp assembly 150 accommodates the angle of the shaft relative to the head 40. The aforedescribed adjustable components of the apparatus 36 have been found to accommodate the shafts of trimmers whose shafts form different angles with the heads thereof and are advantageous in this respect.

The position of the trimmer head 40 relative to the remainder of the frame 56 may thereafter be adjusted by slidably moving the boom section 54 along the length of the corresponding tube member 56 to accommodate a variance in the lateral position of the head 40 relative to the rear of the tractor 24. As the boom section 54 is shifted along the length of the tube member 56, the second boom section 55 may also be adjusted, as necessary, along the length of the tube member 70.

During operative of the system 22, the apparatus 36 and trimmer 34 are pulled along by the tractor 24 so that the rotating trimmer string 34 moves in cutting relationship with grass disposed generally to one side of the tractor 24, as illustrated in FIG. 1. If the tractor 24 is driven past an upstanding object, such as the tree stump 256 in FIG. 13, so that the guard 99 of the boom section 54 is moved into engagement with the object 256, the wheeled frame 52 is permitted to deflect to the FIG. 13 phantom-line position as the guard 99 is moved past the object 256. Upon movement of the guard 99 against the object 256, the rollers 120 rollably engage and roll along the object 256 to reduce the likelihood of damage to the guard 99 as the guard 99 is moved past the object 256 and facilitate movement of the guard 99 past the object 256. In addition, since the diameter of the hoop 98 corresponds generally with the cutting swath of the rotating trimmer string 48, the rotation of the string 48 is not interrupted by the object 256 so that the trimmer 34 continues to cut grass within the boundary of the hoop 98, even as the guard 99 is moved past the object 256. Once the guard 99 is moved past the object 256, the guard 99, as well as the remainder of the frame 52, is returned to its operative position by means of the spring 234.

It follows from the foregoing that the present invention accomplishes its intended purposes and objectives. In particular, an apparatus 36 has been described which supports a rotatable cutter, such as the rotatable string of a trimmer head, in a manner enabling the cutter to be pulled along behind a prime mover, such as a tractor 24, and which protects the cutter from damage by an upstanding object toward which the cutter may be driven. Such an apparatus 36 has been found to be particularly well-suited for trimming grass growing in a ditch or around or along upstanding objects such as fence posts, chain-link fences or cemetery headstones.

Figure 15:
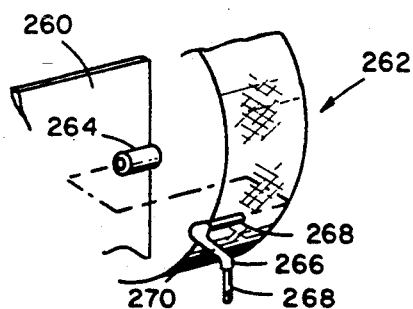
FIG. 15 is a fragmentary perspective view of an alternative arrangement with which an apparatus embodying features of the present invention can be connected to the rear of a tractor.

It will be understood that numerous modifications and substitutions may be had to the aforedescribed embodiment without departing from the spirit of the invention. For example, although the pivotal connecting means 192 has been shown and described as including ball-type connecting assemblies 200 for joining the arm members 194 to the rear of the tractor 24, a connecting assembly for joining the arm members 194 to the tractor 24 may take alternative forms. For example, there is shown in FIG. 15 an arm member 258 which is pivotally connected to a hitch plate 260 attached to the rear of a tractor 262. In the FIG. 15 example, a collar 264 is attached adjacent a side edge of the hitch plate 260 so that its opening extends substantially horizontally, and a connecting member 266 is connected to the collar 264, as shown. The connecting member 266 has two angularly-related leg portions 268 extending normal to a central portion 270 for joining the arm member 258 to the collar 264. To this end, the arm member 258 has a vertically-disposed opening 272 for loosely receiving the one of the leg portions 268, and the opening in the collar 264 loosely accepts the other leg portion 268. Once secured within the corresponding openings with suitable keys, the arm member 258 may be pivoted vertically with respect to the hitch plate 260 as the connecting member 266 pivots within the collar 264 and may be pivoted horizontally with respect to the hitch plate 260 as the arm member 258 pivots about the connecting member 266.

In addition, although the aforedescribed embodiment has been shown and described as being connected to the rear of a tractor 24 at two laterally-spaced locations along hitch bars 196, an apparatus in accordance with the broader aspects of the present invention may be connected to the rear of a tractor at three locations, such as the locations provided by a three-point hitch of a tractor. If the tractor with which such an apparatus is utilized includes a lift mechanism associated with its three point hitch, the lift mechanism enables the apparatus to be lifted from the ground when not in use.

Figure 16:
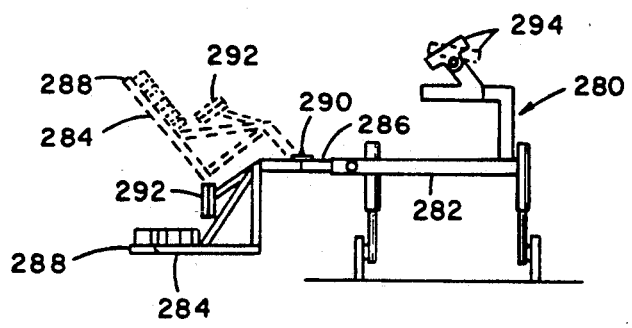
FIG. 16 is a hematic elevational view of an alternative apparatus as viewed generally from the rear.

Still further, there is illustrated in FIG. 16 an apparatus 280 including a wheeled section 282 and a hinged boom section 284 attached to the wheeled section 282.

The boom section 282 includes a tube member 286 releasably fixed in position with respect to the wheeled section 282 and a guard 288 connected to the tube member 286 by means of a hinge 290 so that the guard 288 may be pivotally moved between the position illustrated in solid lines in FIG. 16 and the position illustrated in phantom in FIG. 16. By appropriately securing the shaft of a trimmer within the clamp arrangement 292 associated with the guard 288 and within the clamp assembly 294 associated with the wheeled section 288, the guard 288 can be held in the illustrated phantom-line position for use of the trimmer. The capacity of the apparatus 280 to orient the head of a trimmer in such an angular relation with respect to the wheeled section 282 accommodates the use of a trimmer along a hillside or ditch having a surface whose slope is not the same as that of the ground over which the wheeled section 282 is pulled.

Figure 17:
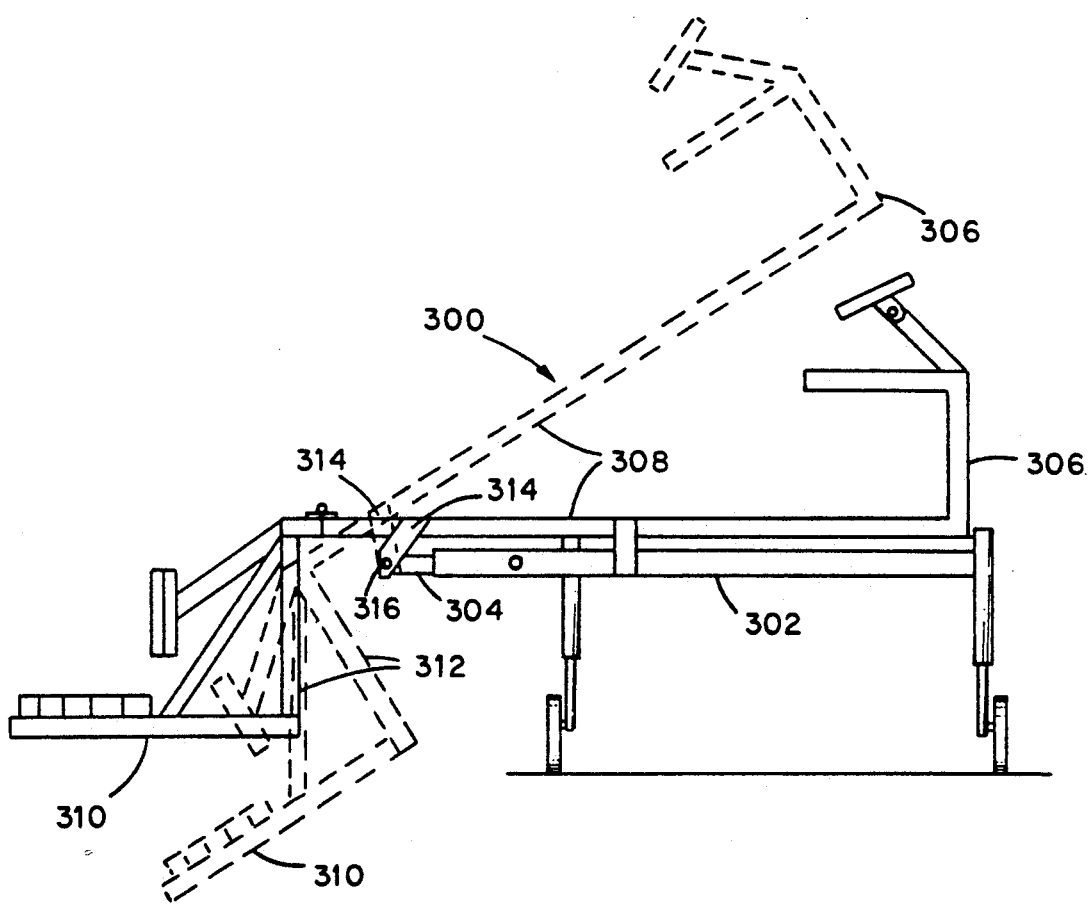
FIG. 17 is a schematic elevational view of another alternative apparatus as viewed generally from the rear.

Yet still further, there is illustrated in FIG. 17 an apparatus 300 including a wheeled section 302 having a boom 304 and a trimmer support assembly 306 hinged to the boom 304. The boom 304 is movable in a telescoping fashion with respect to the remainder of the wheeled section 302, and the support assembly 306 includes a main beam 308 and a guard 310 and support bracket 312 joined to opposite ends of the beam 308. The support assembly 306 is hingedly joined to an end of the boom 304 by means of a bracket 314 fixed to the beam 308 and a pivot pin 316 extending through aligned openings in the boom 304 and bracket 314. By pivoting the beam 308 about the boom 304 between the position illustrated in solid lines in FIG. 17 and, for example, the position illustrated in phantom in FIG. 17, the head of a trimmer supported by the support assembly 306 can be oriented in an angular relation with respect to the wheeled section 302 for trimming grass or weeds along a hillside or ditch.

Accordingly, the aforedescribed embodiments are intended for the purpose of illustration and not as limitation.

I claim:

1. A support apparatus for a cutter adapted to cut grass when rotated and moved forwardly into cutting relationship with the grass and wherein the support apparatus is intended to be moved by a prime mover during use, the support apparatus comprising:

a frame for supporting the cutter for rotation and including guard means disposed on the forward side of the cutter, said frame including a main section disposed generally behind the prime mover when the frame is connected thereto and a boom section from which the cutter is suspended for rotation, said boom section being attached to the main section in a manner which accommodates an adjustment in position of the boom section relative to the main section to accommodate an adjustment in position of the cutter relative to the prime mover, each of the main section and the boom section including a tube member, and one tube member is positioned within the other of the tube member to accommodate a telescopic movement of the tube members relative to one another as the boom section is adjusted in position relative to the main section, means for pivotally connecting the frame to the prime mover enabling the frame to be moved by the prime mover and to permit pivotal movement of the frame relative to the prime mover between an operative position at which the cutter is positioned for cutting grass and a deflected position so that when the frame is positioned in its operative position and the guard means is moved into contact with an upstanding object, the frame can be pivoted by the upstanding object toward its deflected position to accommodate the movement of the guard means past the object; and means associated with the frame for biasing the frame from the deflected position toward the operative position so that when the frame is moved out of its operative position by an upstanding object and is subsequently advanced so that the guard means is moved past the object, the frame is returned to its operative position by the biasing means.

2. The apparatus as defined in claim 1 wherein the connecting means includes means for cooperating between the prime mover and the frame so that the frame moves in a substantially lateral direction with respect to the direction of movement of the primer mover as the frame is moved between its operative and deflected position.

3. The apparatus as defined in claim 2 wherein the connecting means includes a pair of arm members each pivotally connectable at one end to the prime mover and pivotally connected at the other end to the frame to accommodate the pivotal movement of the frame between the operative and deflected positions as aforesaid.

4. The apparatus as defined in claim 1 wherein the frame includes at least one wheel for rollably engaging the ground during use and means for adjusting the height of remainder of the frame relative to the ground to thereby adjust the height of the cutter relative to the ground.

5. The apparatus as defined in claim 1 wherein the cutter is provided by the string of a portable string trimmer having a shaft and the frame includes means for releasably securing the shaft of the trimmer to the remainder of the wheeled frame.

6. The apparatus as defined in claim 5 wherein the string trimmer includes a motor for rotating the string and a movable throttle for controlling the speed of the motor, and the apparatus further comprises means connected to the frame for cooperating with the throttle so that an operator can control the movement of the throttle by way of the connecting cooperating means.

7. The apparatus as defined in claim 5 wherein the string trimmer includes a head and a depressible member which extends the length of the string by an incremental amount when the depressible member is depressed in relation to the head and the apparatus further comprises means attached to the frame for cooperating with the depressible member of the trimmer so that an operator can depress the depressible member of the trimmer and thereby control the length of the trimmer string by way of the attached cooperating means.

8. A support apparatus for a cutter adapted to cut grass when rotated and moved forwardly into cutting relationship with the grass and wherein the support apparatus is intended to be moved by a prime mover during use, the support apparatus comprising:

a frame for supporting the cutter for rotation and including guard means disposed on the forward side of the cutter, said guard means including a member extending for an appreciable distance around the cutter and including a plurality of rollers rotatably attached to the guard member along the periphery thereof so that at least a portion of the circumference of each roller is disposed to a side of guard member opposite the cutter so that when the guard is moved into contact with the upstanding object, the rollers rollably engage the upstanding object to facilitate the movement of the cutter past the object;

means for pivotally connecting the frame to the prime mover enabling the frame to be moved by the prime mover and to permit pivotal movement of the frame relative to the prime mover between an operative position at which the cutter is positioned for cutting grass and a deflected position so that when the frame is positioned in its operative position and the guard means is moved into contact with an upstanding object, the frame can be pivoted by the upstanding object toward its deflected position to accommodate the movement of the guard means past the object; and means associated with the frame for biasing the frame from the deflected position toward the operative position so that when the frame is moved out of its operative position by an upstanding object and is subsequently advanced so that the guard means is moved past the object, the frame is returned to its operative position by the biasing means.

9. A mowing system connectable to a primer mover for movement therewith, the system comprising:

a grass cutter adapted to cut grass as the cutter is rotated and moved into cutting relationship with the grass;

a frame for supporting the cutter for rotation and including a guard disposed on the forward side of the cutter, said frame including a main section disposed generally behind the prime mover when the frame is connected thereto and a boom section from which the cutter is suspended for use, and the boom section is attached to the main section in a manner which accommodates an adjustment in position of the boom section relative to the main section to accommodate an adjustment in position of the cutter relative to the prime mover, said main section and said boom section each including a tube member, wherein one tube member is positioned within the other tube member to accommodate a telescopic movement of the tube members relative to one another as the boom section is adjusted in position relative to the main section;

means for pivotally connecting the frame to the prime mover for pivotal movement between an operative position at which the cutter is positioned for cutting grass and a deflected position so that when the frame is positioned in its operative position and the guard is moved against an upstanding object, the frame is permitted to pivot toward its deflected position to accommodate the movement of a guard past the object; and means associated with the frame for biasing the frame from the deflected position toward the operative position so that when the frame is moved out of its operative position by an upstanding object and is subsequently advanced so that the guard is moved past the object, the frame is returned to its operative position by the biasing means.

10. The system as defined in claim 9 wherein the connecting means includes means for cooperating between the prime mover and the frame so that the frame moves in a substantially lateral direction with respect to the direction of movement of the prime mover as the frame is moved between its operative and deflected positions.

11. The system as defined in claim 10 wherein the connecting means includes a pair of arm members each pivotally connectable at one end to the prime mover and pivotally connected at the other end to the frame to accommodate the pivotal movement of the frame between the operative and deflected positions as aforesaid.

12. The system as defined in claim 9 wherein said frame includes at least one wheel for rollably engaging the ground during use and means for adjusting the height of remainder of the frame relative to the ground to thereby adjust the height of the cutter relative to the ground.

13. The system as defined in claim 9 wherein the cutter is provided by the string of a portable string trimmer having a shaft and the frame includes means for releasably securing the shaft of the trimmer to the remainder of the wheeled frame.

14. A mowing system connectable to a primer mover for movement therewith, the system comprising:

a grass cutter adapted to cut grass as the cutter is rotated and moved into cutting relationship with the grass;

a frame for supporting the cutter for rotation and including a guard disposed on the forward side of the cutter, said guard including a member extending for an appreciable distance around the cutter and a plurality of spaced rollers rotatably attached to the guard member along the periphery thereof so that at least a portion of the circumference of each roller is disposed to a side of the guard member opposite the cutter so that when the guard is moved into contact with the upstanding object, the rollers rollably engage the upstanding object to facilitate the movement of the cutter past the object;

means for pivotally connecting the frame to the prime mover for pivotal movement between an operative position at which the cutter is positioned for cutting grass and a deflected position so that when the frame is positioned in its operative position and the guard is moved against an upstanding object, the frame is permitted to pivot toward its deflected position to accommodate the movement of a guard past the object; and means associated with the frame for biasing the frame from the deflected position toward the operative position so that when the frame is moved out of its operative position by an upstanding object and is subsequently advanced so that the guard is moved past the object, the frame is returned to its operative position by the biasing means.

* * * * *